(12) United States Patent
Shimura et al.

(10) Patent No.: US 9,818,132 B2
(45) Date of Patent: Nov. 14, 2017

(54) ADVERTISEMENT DELIVERY MANAGEMENT APPARATUS AND ADVERTISEMENT DELIVERY MANAGEMENT METHOD

(71) Applicant: YAHOO JAPAN CORPORATION, Tokyo (JP)

(72) Inventors: Kazuhiko Shimura, Tokyo (JP); Akira Tajima, Tokyo (JP); Koji Tsukamoto, Tokyo (JP); Hiroyuki Kato, Tokyo (JP); Takenobu Dei, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 579 days.

(21) Appl. No.: 14/107,428

(22) Filed: Dec. 16, 2013

(65) Prior Publication Data
US 2014/0180813 A1 Jun. 26, 2014

(30) Foreign Application Priority Data

Dec. 26, 2012 (JP) .................................. 2012-282033

(51) Int. Cl.
*G06Q 30/02* (2012.01)

(52) U.S. Cl.
CPC ..... *G06Q 30/0255* (2013.01); *G06Q 30/0269* (2013.01)

(58) Field of Classification Search
USPC ...................................................... 705/14.66
See application file for complete search history.

(56) References Cited

U.S. PATENT DOCUMENTS

| 2008/0300964 A1 | 12/2008 | Raghunandan |
| 2009/0132346 A1 | 5/2009 | Duggal et al. |
| 2010/0082402 A1 | 4/2010 | Kantak et al. |

(Continued)

FOREIGN PATENT DOCUMENTS

| JP | A-9-91358 | 4/1997 |
| JP | A-2001-265810 | 9/2001 |

(Continued)

OTHER PUBLICATIONS

Dated Dec. 16, 2015 Office Action issued in U.S. Appl. No. 14/103,406.

(Continued)

*Primary Examiner* — David Stoltenberg
*Assistant Examiner* — Allan Woodworth, II
(74) *Attorney, Agent, or Firm* — Oliff PLC (57) ABSTRACT

An advertisement delivery management apparatus according to an embodiment includes an allocation unit and an advertisement delivery unit. The allocation unit selects delivery target users who have the user attribute designated by each of order requests and whose number corresponds to the number of deliveries designated by each of order requests, from a plurality of delivery target users predicted as future advertisement delivery destinations, and allocates the selected delivery target users to the order requests. The advertisement delivery unit selects the advertising information of the order request corresponding to a user attribute of a user of a user terminal on the basis of the allocation result of the allocation unit and transmits the selected advertising information to the user terminal.

8 Claims, 7 Drawing Sheets

(56) References Cited

U.S. PATENT DOCUMENTS

| 2010/0161419 | A1 | 6/2010 | Tomlin |
| 2010/0185484 | A1 | 7/2010 | Sordo et al. |
| 2011/0161162 | A1 | 6/2011 | Ketchum |
| 2011/0251875 | A1* | 10/2011 | Cosman ............... G06Q 10/087 705/7.31 |
| 2011/0258045 | A1 | 10/2011 | Chickering et al. |
| 2012/0041817 | A1 | 2/2012 | Priyadarshan et al. |

FOREIGN PATENT DOCUMENTS

| JP | A-2001-297251 | 10/2001 |
| JP | 2001-325505 A | 11/2001 |
| JP | A-2001-306439 | 11/2001 |
| JP | A-2002-41670 | 2/2002 |
| JP | A-2002-203119 | 7/2002 |
| JP | A-2002-288322 | 10/2002 |
| JP | A-2003-6518 | 1/2003 |
| JP | A-2003-67290 | 3/2003 |
| JP | A-2005-196777 | 7/2005 |
| JP | A-2007-200168 | 8/2007 |
| JP | A-2009-163425 | 7/2009 |
| JP | 2012-043193 A | 3/2012 |
| JP | A-2012-108663 | 6/2012 |
| WO | WO 02/061619 A1 | 8/2002 |

OTHER PUBLICATIONS

Dated Mar. 18, 2016 Office Action Issued in U.S. Appl. No. 14/094,198.
Dated Mar. 23, 2016 Office Action issued in U.S. Appl. No. 14/086,489.
Dated Mar. 24, 2016 Office Action Issued in U.S. Appl. No. 14/086,604.
Dated Mar. 29, 2016 Office Action issued in Japanese Patent Application No. 2014-126340.
Dated Mar. 11, 2015 Office Action issued in U.S. Appl. No. 14/103,406.
Japanese Office Action issued in Japanese Application No. 2012-270605 dated Jun. 3, 2014 (with translation).
Japanese Office Action issued in Japanese Application No. 2012-282033 dated May 20, 2014 (with translation).
Dated Jun. 16, 2015 Office Action issued in Japanese Patent Application No. 2014-126340.
Dated Jun. 3, 2014 Office Action issued in Japanese Application No. 2012-270219 (with translation).
Dated Jun. 17, 2014 Office Action issued in Japanese Application No. 2012-258777 (with translation).
Dated Jun. 17, 2014 Office Action issued in Japanese Application No. 2012-258788 (with translation).
Dated May 2, 2016 Office Action issued in U.S. Appl. No. 14/097,563.
Dated November 3, 2016 Office Action issued in U.S. Appl. No. 14/086,604.
Dated November 2, 2016 Office Action issued in U.S. Appl. No. 14/086,489.
Dated Mar. 7, 2017 Office Action issued in U.S. Appl. No. 14/086,604.
Dated Mar. 7, 2017 Office Action issued in U.S. Appl. No. 14/086,489.
Aug. 8, 2017 Office Action Issued in U.S. Appl. No. 14/089,489.
Aug. 17, 2017 Office Action issued in U.S. Appl. No. 14/086,604.

* cited by examiner

| DELIVERY TARGET ID | ALLOCATION STATE | ALLOCATION TARGET | PSYCHOGRAPHIC ATTRIBUTES | | | | | DEMOGRAPHIC ATTRIBUTES | | |
|---|---|---|---|---|---|---|---|---|---|---|
| | | | VEHICLE | COSMETICS | CLOTHES | TRAVEL | ... | SEX | AGE | ... |
| F1 | 0 | 0 | 0 | 1 | 0 | 0 | ... | 1 | 54 | ... |
| F2 | 1 | O3 | 0 | 0 | 1 | 0 | ... | 2 | 22 | ... |
| F3 | 0 | 0 | 1 | 0 | 0 | 1 | ... | 2 | 32 | ... |
| F4 | 0 | 0 | 0 | 0 | 0 | 1 | ... | 1 | 21 | ... |
| F5 | 1 | O3 | 0 | 0 | 1 | 0 | ... | 2 | 43 | ... |
| F6 | 0 | 0 | 0 | 1 | 1 | 0 | ... | 1 | 18 | ... |
| F7 | 1 | O4 | 0 | 1 | 1 | 0 | ... | 1 | 38 | ... |
| F8 | 1 | O1 | 1 | 0 | 0 | 0 | ... | 1 | 27 | ... |
| F9 | 1 | O4 | 0 | 1 | 0 | 0 | ... | 2 | 61 | ... |
| F10 | 1 | O1 | 1 | 0 | 1 | 0 | ... | 1 | 52 | ... |
| ⋮ | ⋮ | ⋮ | ⋮ | ⋮ | ⋮ | ⋮ | ⋮ | ⋮ | ⋮ | ⋮ |

FIG.4

| ADVERTISEMENT ID | USER ATTRIBUTE | DELIVERY PERIOD | NUMBER OF DELIVERIES | ADVERTISING INFORMATION |
|---|---|---|---|---|
| O1 | VEHICLE | JANUARY 1, 2013 TO JANUARY 31, 2013 | 100 | BANNER ADVERTISEMENT Ya |
| O2 | VEHICLE & TRAVEL | JANUARY 1, 2013 TO JANUARY 31, 2013 | 200 | VIDEO ADVERTISEMENT Yb |
| O3 | CLOTHES | JANUARY 1, 2013 TO JANUARY 31, 2013 | 150 | BANNER ADVERTISEMENT Yc |
| ⋮ | ⋮ | ⋮ | ⋮ | ⋮ |

FIG.5

| DELIVERY TARGET ID | NUMBER OF USER ATTRIBUTES |
|---|---|
| F1 | 3 |
| F3 | 4 |
| F4 | 3 |
| F6 | 4 |
| TOTAL NUMBER OF USER ATTRIBUTES | 14 |

FIG.6

| ATTRIBUTE PATTERN | | | | | DELIVERY TARGET USER | |
|---|---|---|---|---|---|---|
| Pj | ATTRIBUTES | | | | NUMBER OF USERS ($c\_j$) | DELIVERY TARGET ID |
| | VEHICLE | COSMETICS | CLOTHES | TRAVEL | | |
| P1 | 1 | 0 | 0 | 0 | 9020 | F8,... |
| P2 | 0 | 1 | 0 | 0 | 5302 | F1, F9,... |
| P3 | 0 | 0 | 1 | 0 | 2319 | F2, F5,... |
| P4 | 0 | 0 | 0 | 1 | 4287 | F4,... |
| P5 | 1 | 0 | 0 | 1 | 4030 | F3,... |
| P6 | 0 | 1 | 1 | 0 | 2900 | F6, F7,... |

FIG.7

| Oi | ATTRIBUTE PATTERN | | | | | | DESIGNATED NUMBER OF DELIVERIES ($o\_i$) |
|---|---|---|---|---|---|---|---|
| | P1 | P2 | P3 | P4 | P5 | P6 | |
| O1 | 77 ($a\_1\_1$) | 0 ($a\_1\_2$) | 0 ($a\_1\_3$) | 0 ($a\_1\_4$) | 23 ($a\_1\_5$) | 0 ($a\_1\_6$) | 100($o\_1$) |
| O2 | 0 ($a\_2\_1$) | 0 ($a\_2\_2$) | 0 ($a\_2\_3$) | 0 ($a\_2\_4$) | 200 ($a\_2\_5$) | 0 ($a\_2\_6$) | 200($o\_2$) |
| ⋮ | ⋮ | ⋮ | ⋮ | ⋮ | ⋮ | ⋮ | ⋮ |
| TOTAL NUMBER | 927 ($\Sigma a\_i\_1$) <9020 | 354 ($\Sigma a\_i\_2$) <5302 | 218 ($\Sigma a\_i\_3$) <2319 | 791 ($\Sigma a\_i\_4$) <4287 | 285 ($\Sigma a\_i\_5$) <4030 | 625 ($\Sigma a\_i\_6$) <2900 | 3200 ($\Sigma o\_j$) |

FIG.8

| Oi | ATTRIBUTE PATTERN | | | | | |
|---|---|---|---|---|---|---|
| | P1 | P2 | P3 | P4 | P5 | P6 |
| O1 | 0.0830 ($V\_1\_1$) | 0 ($V\_1\_2$) | 0 ($V\_1\_3$) | 0 ($V\_1\_4$) | 0.0057 ($V\_1\_5$) | 0 ($V\_1\_6$) |
| O2 | 0 ($V\_2\_1$) | 0 ($V\_2\_2$) | 0 ($V\_2\_3$) | 0 ($V\_2\_4$) | 0.0496 ($V\_2\_5$) | 0 ($V\_2\_6$) |
| ⋮ | ⋮ | ⋮ | ⋮ | ⋮ | ⋮ | ⋮ |

FIG.9

| USER ID | PSYCHOGRAPHIC ATTRIBUTES ||||| DEMOGRAPHIC ATTRIBUTES |||
|---|---|---|---|---|---|---|---|---|
| | VEHICLE | COSMETICS | CLOTHES | TRAVEL | ... | SEX | AGE | ... |
| U1 | 1 | 0 | 0 | 1 | ... | 2 | 21 | ... |
| U2 | 0 | 0 | 1 | 0 | ... | 1 | 44 | ... |
| ⋮ | ⋮ | ⋮ | ⋮ | ⋮ | ⋮ | ⋮ | ⋮ | ⋮ |

FIG.10

| DATE AND TIME | USER ID |
|---|---|
| 12/1/2013 6:11:05 | U1 |
| 12/1/2013 6:11:06 | U102 |
| 12/1/2013 6:12:08 | U82 |
| 12/1/2013 6:12:44 | U1 |
| 12/1/2013 6:13:02 | U102 |
| 12/1/2013 6:13:21 | U82 |
| ⋮ | ⋮ |

ADVERTISEMENT DELIVERY MANAGEMENT APPARATUS AND ADVERTISEMENT DELIVERY MANAGEMENT METHOD

CROSS-REFERENCE TO RELATED APPLICATIONS

The present application claims priority to and incorporates by reference the entire contents of Japanese Patent Application No. 2012-282033 filed in Japan on Dec. 26, 2012.

BACKGROUND OF THE INVENTION

1. Field of the Invention

The present invention relates to an advertisement delivery management apparatus and an advertisement delivery management method.

2. Description of the Related Art

In recent years, with the rapid spread of a network such as the Internet, advertisements have been actively delivered through the network. As an aspect of the delivery of the advertisements, display advertising has been known which displays image or video advertisements in a predetermined space of a page (hereinafter, referred to as an advertisement delivery target page) which is an advertisement delivery target.

In the display advertising, advertisements are delivered to users who have user attributes (for example, sex, age, and interest) designated by the advertiser. Therefore, advertisements are effectively delivered (for example, see Japanese Laid-open Patent Publication No. 2002-203119).

In response to an advertisement delivery order request from the advertiser, when there is a sales order stock satisfying delivery conditions, such as user attributes or the number of deliveries, designated by the order request, the sales order stock is allocated and the order request is accepted (for example, see Japanese Laid-open Patent Publication No. 2002-288322).

However, in the advertisement delivery technique according to the related art, when a plurality of advertising information items can be transmitted to a user of a user terminal to which advertising information is to be delivered, the advertising information to be delivered is determined on the basis of the remaining amount of advertising information.

Therefore, there is a large difference between the allocated content of an order request for a sales order stock and the actual content of delivered information and it is difficult to deliver advertising information of the designated number of deliveries in response to the accepted order requests.

SUMMARY OF THE INVENTION

According to an exemplary embodiment, an advertisement delivery management apparatus includes a prediction information storage unit, an acquisition unit, an allocation unit, and an advertisement delivery unit. The prediction information storage unit stores information including user attributes of a plurality of delivery target users predicted as future advertisement delivery destinations. The acquisition unit acquires order requests of which each designates advertising information, a user attribute, and a number of deliveries. The allocation unit selects the delivery target users who have the user attribute designated by each of the order requests and whose number corresponds to the number of deliveries designated by each of the order requests, from the plurality of delivery target users, and that allocates the selected delivery target users to the order requests. The advertisement delivery unit selects the advertising information of the order request corresponding to a user attribute of a user of a user terminal on the basis of the allocation result of the allocation unit and transmits the selected advertising information to the user terminal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an advertisement delivery management apparatus and an advertisement delivery management method according to an exemplary embodiment (hereinafter, referred to as an "embodiment") of the present disclosure will be described in detail with reference to the accompanying drawings. The advertisement delivery management apparatus and advertisement delivery management method according to the present disclosure are not limited by the embodiment. In the following description, in some cases, a "database" is described as a "DB".

1. Advertisement Delivery Management Process

Figure 1:
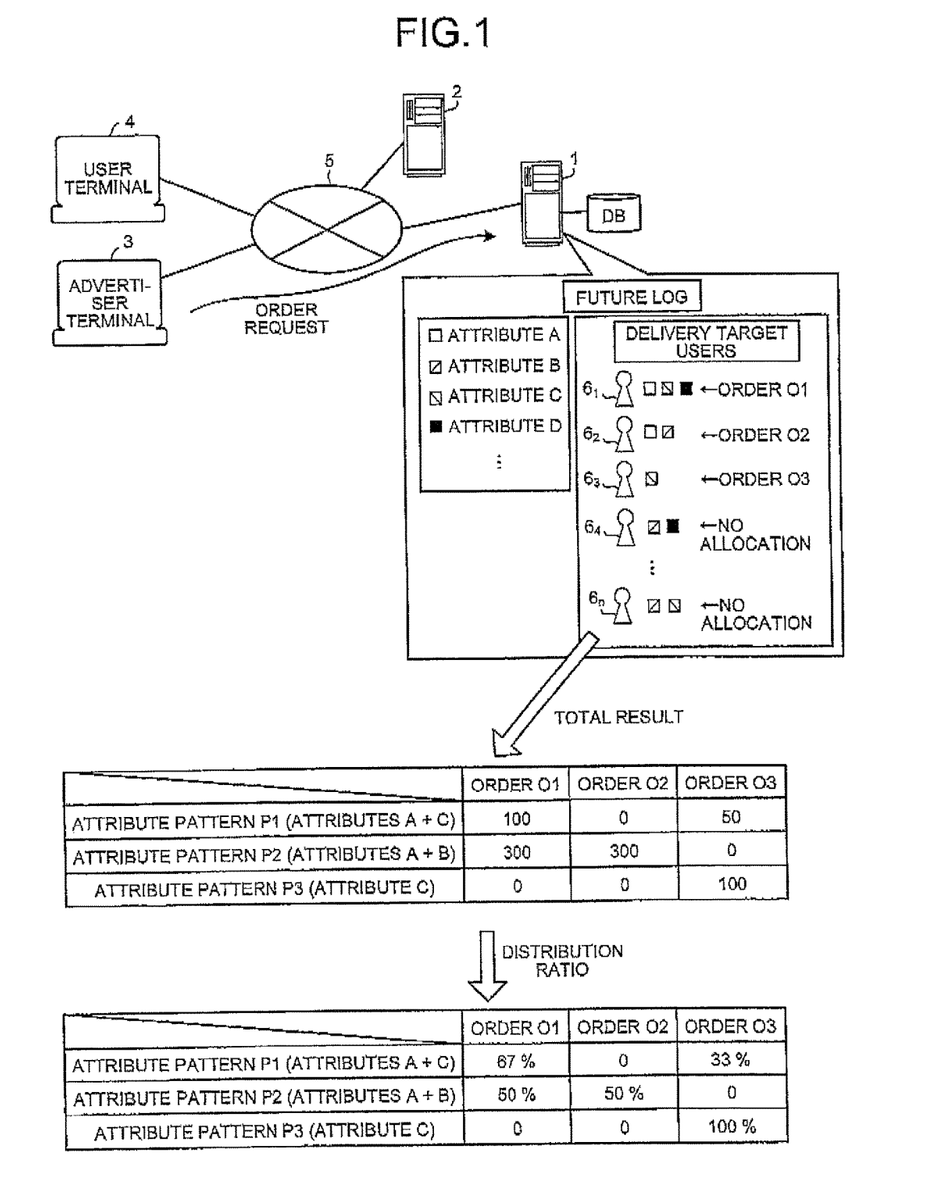
FIG. 1 is a diagram illustrating an advertisement delivery management process according to an embodiment.

First, an advertisement delivery management process according to the embodiment will be described. FIG. 1 is a diagram illustrating the advertisement delivery management process according to the embodiment. The advertisement delivery management process makes it possible to accurately accept an order request from an advertiser.

As illustrated in FIG. 1, an advertisement delivery management system according to the embodiment includes an advertisement delivery management apparatus 1, an information delivery apparatus 2, an advertiser terminal 3, and a user terminal 4. The advertisement delivery management apparatus 1, the information delivery apparatus 2, the advertiser terminal 3, and the user terminal 4 are connected to each other through a communication network 5. The communication network 5 is an Internet protocol (IP) network, such as the Internet. In practice, there are a plurality of advertiser terminals 3 and a plurality of user terminals 4. However, FIG. 1 illustrates one advertiser terminal 3 and one user terminal 4, for convenience of explanation.

The advertiser terminal 3 is a terminal apparatus of the advertiser who wants to deliver advertisements and sends an order request to deliver advertisements to the user terminal 4 of the user with predetermined user attributes to the advertisement delivery management apparatus 1. Specifically, the advertiser terminal 3 transmits, to the advertisement delivery management apparatus 1, an order request including advertising information which the advertiser wants to insert into an advertisement delivery target page, information on the user attributes which are designated as the delivery destination of the advertising information, and information on the delivery period of the advertising information.

Examples of the advertising information include two-dimensional content and three-dimensional content, such as banner advertisements, text advertisements, and video advertisements. Hereinafter, in some cases, the user attribute designated by the order request is referred to as a designated user attribute, the number of deliveries designated by the order request is referred to as the designated number of deliveries, and the delivery period designated by the order request is referred to as a designated delivery period.

The user terminal 4 is the terminal apparatus of the user who accesses the advertisement delivery management apparatus 1 and the information delivery apparatus 2. When the information delivery apparatus 2 is accessed by the user terminal 4, for example, it transmits an advertisement delivery target page, such as a Web page, to the user terminal 4. The advertisement delivery target page includes the uniform resource locator (URL) of the advertising information. The user terminal 4 requests the advertisement delivery management apparatus 1 to transmit advertising information on the basis of the URL. When receiving the request to transmit the advertising information from the user terminal 4, the advertisement delivery management apparatus 1 transmits, to the user terminal 4, advertising information corresponding to the user attributes of the user (hereinafter, referred to as a terminal user in some cases) of the user terminal 4.

The URL of the advertising information may not be the URL of the advertisement delivery management apparatus L, but may be the URL of the information delivery apparatus 2. In this case, the user terminal 4 requests the information delivery apparatus 2 to transmit advertising information on the basis of the URL of the advertising information. When receiving the request, the information delivery apparatus 2 requests the advertisement delivery management apparatus 1 to transmit advertising information. The advertisement delivery management apparatus 1 transmits advertising information corresponding to the transmission request from the information delivery apparatus 2 to the information delivery apparatus 2. When receiving the advertising information from the advertisement delivery management apparatus 1, the information delivery apparatus 2 transmits the advertising information to the user terminal 4.

The advertisement delivery management apparatus 1 performs a process of accepting an advertisement delivery order request, a process of allocating user attributes to the accepted order request, and a process of distributing the advertising information designated by the order request to perform processes from the reception of the advertisement delivery order to the delivery of the advertising information.

The advertisement delivery management apparatus 1 stores information including the user attributes of a plurality of delivery target users, who are predicted as future advertisement delivery destinations, as a future log in a DB and performs the process of accepting the order request and the process of allocating the user attributes on the basis of the future log.

In the example illustrated in FIG. 1, information on delivery target users $6_1, 6_2, \ldots, 6_n$ (hereinafter, generically referred to as a delivery target user 6 in some cases) who are predicted as the future advertisement delivery destinations is stored in the DB. When an advertisement delivery order request is received from the advertiser terminal 3, the advertisement delivery management apparatus 1 determines whether there is a sales order stock satisfying the delivery conditions designated by the order request. When it is determined there is a sales order stock satisfying the delivery conditions, the advertisement delivery management apparatus 1 accepts the order request from the advertiser terminal 3.

Specifically, the advertisement delivery management apparatus 1 counts the number of sales order stocks. That is, when the advertisement delivery order request is received from the advertiser terminal 3, the advertisement delivery management apparatus 1 counts the number of non-allocated users with the user attributes designated by the order request among the delivery target users (hereinafter, referred to as non-allocated users in some cases) who have not been allocated to the order request. When the count result is equal to or greater than the number of deliveries designated by the order request, the advertisement delivery management apparatus 1 receives the order request from the advertiser terminal 3.

For example, a case is considered in which order requests O1 to O3 are issued from the advertiser terminal 3. It is assumed that, in the order requests O1 to O3, the designated user attributes are an "attribute A", an "attribute A+B", and an "attribute C" and the designated numbers of deliveries are "400", "300", and "150", respectively.

When the number of delivery target users with the "attribute A" is equal to or greater than "400" for the order request O1, the advertisement delivery management apparatus 1 receives the order request O1. When the number of delivery target users with the "attribute A+B" is equal to or greater than "300" for the order request O2, the advertisement delivery management apparatus 1 receives the order request O2. The advertisement delivery management apparatus 1 allocates the delivery target users to a new advertisement delivery order request such that, for example, the number of delivery target users who have not been allocated is the maximum.

In the example illustrated in FIG. 1, the delivery target user $6_1$ has user attributes A, C, and D and is allocated to the order request O1, the delivery target user $6_2$ has user attributes A and B and is allocated to the order request O2, and the delivery target user 63 has the user attribute C and is allocated to the order request O3. The delivery target users $6_4$ and $6_n$ are the non-allocated users who have not been allocated to the order requests O1 to O3.

Until the designated delivery period after allocating the delivery target users to the order requests received from the advertiser terminal 3, the advertisement delivery management apparatus 1 calculates the ratio of the allocated users in each order request for each user attribute pattern (hereinafter, referred to as an attribute pattern). The advertisement delivery management apparatus 1 includes a plurality of attribute patterns and the delivery target user is allocated to any one of the attribute patterns.

In the example illustrated in FIG. 1, for example, the number of delivery target users allocated to the attribute pattern P1 is "100" for the order request O1 and is "50" for the order request O3. The advertisement delivery management apparatus 1 sets the delivery ratio of advertising information corresponding to the order request O1 to "67% (=100/150)" and sets the delivery ratio of advertising information corresponding to the order request O3 to "33% (=50/150)" for the user with the attribute pattern P1.

In addition, the advertisement delivery management apparatus 1 sets the delivery ratio of advertising information corresponding to the order request O1 to "50% (=300/600)" and sets the delivery ratio of advertising information corresponding to the order request O2 to "50% (=300/600)" for the user with the attribute pattern P2. The advertisement delivery management apparatus 1 sets the delivery ratio of advertising information corresponding to the order request O3 to "100% (=100/100)" for the user with the attribute pattern P3.

As such, when delivering the advertising information, the advertisement delivery management apparatus 1 delivers advertising information corresponding to the allocation result of the delivery target user. Therefore, when the user having the same user attributes as the predicted future log accesses the apparatus, it is possible to deliver advertising information according to the management of the sales order stock and appropriately deliver advertisements in response to the accepted order request.

As described above, the delivery ratio of the advertising information is calculated by calculating the ratio of the users allocated to each order request for each attribute pattern unit in advance. Therefore, it is possible to deliver advertising information, without damaging the real-time properties of advertisement delivery.

Next, the detailed structure of the advertisement delivery management apparatus 1 which performs the above-mentioned advertisement delivery management process and the detailed content of the process will be described with reference to the drawings.

2. Structure of Advertisement Delivery Management Apparatus 1

Figure 2:
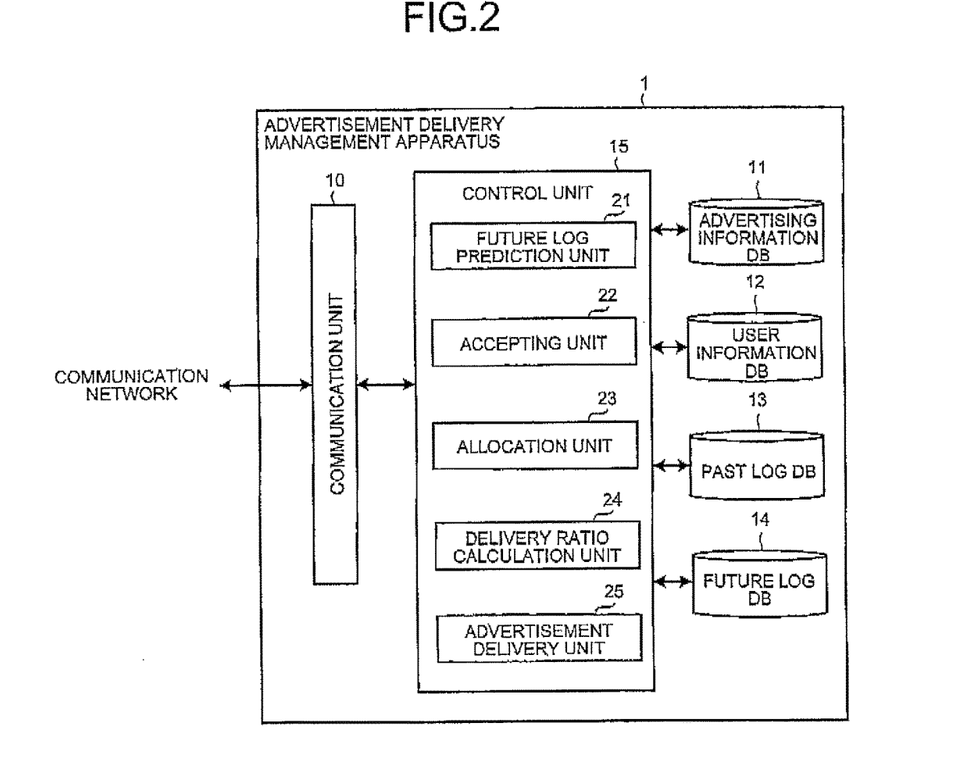
FIG. 2 is a diagram illustrating the structure of an advertisement delivery management apparatus according to the embodiment.

FIG. 2 is a diagram illustrating the structure of the advertisement delivery management apparatus 1 according to the embodiment. As illustrated in FIG. 2, the advertisement delivery management apparatus 1 includes a communication unit 10, an advertising information DB 11, a user information DB 12, a past log DB 13, a future log DB 14, and a control unit 15. The control unit 15 includes a future log prediction unit 21, an accepting unit 22, an allocation unit 23, a delivery ratio calculation unit 24, and an advertisement delivery unit 25.

The communication unit 10 is an interface, such as a network interface card (NIC). The control unit 15 transmits and receives various kinds of information to and from the advertiser terminal 3 or the user terminal 4 through the communication unit 10 and the communication network 5. The advertising information DB 11, the user information DB 12, the past log DB 13, and the future log DB 14 are each a semiconductor memory device, such as a hard disk, random access memory (RAM), or flash memory, or a storage device, such as an optical disk.

The control unit 15 is implemented by an integrated circuit, such as an application specific integrated circuit (ASIC) or a field programmable gate array (FPGA). A central processing unit (CPU) or a micro processing unit (MPU) executes a program stored in the internal storage device using the RAM as a work area to cause the control unit 15 to function as the future log prediction unit 21, the accepting unit 22, the allocation unit 23, the delivery ratio calculation unit 24, and the advertisement delivery unit 25. The structure of the control unit 15 is not limited thereto, but the control unit 15 may have any structure as long as it can perform the following information processing.

Future Log Prediction Unit 21

The future log prediction unit 21 determines a plurality of delivery target users who are predicted as the future advertisement delivery destinations on the basis of an access log table which is stored in the past log DB 13 and will be described below and sets the user information of the determined delivery target users in a future log table stored in the future log DB 14.

Figure 3:
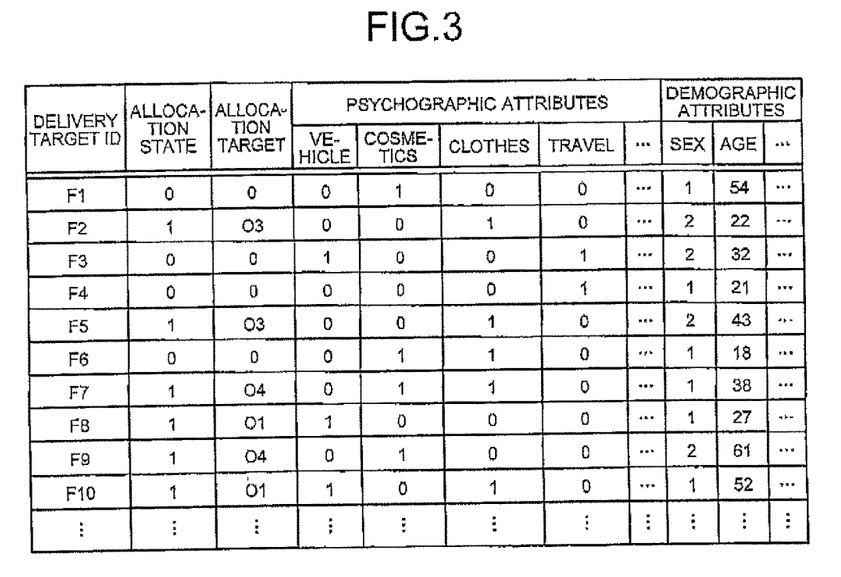
FIG. 3 is a diagram illustrating an example of a future log table.

FIG. 3 is a diagram illustrating an example of the future log table stored in the future log DB 14. As illustrated in FIG. 3, information (hereinafter, referred to as a future log in some cases) on the delivery target user who is predicted as the advertisement delivery destination for a predetermined period in the future is set in the future log table. The future log table illustrated in FIG. 3 includes future log information, such as a "delivery target ID", an "allocation state", an "allocation target", "psychographic attributes", and "demographic attributes".

The "delivery target ID" is identification information allocated to each delivery target user. The delivery target user is a virtual user who is different from the user set in the user information table which is stored in the user information DB 12 and will be described below.

The "allocation state" is information indicating whether the delivery target user has been allocated to the order request. When the delivery target user has been allocated to the order request, "1" is stored in the allocation state. When the delivery target user has not been allocated to the order request, "0" is stored in the allocation state.

The "allocation target" is the advertisement ID of the order request to which the delivery target user is allocated. For example, the delivery target user with a delivery target ID "F5" is allocated to the order request O3. When the order request is not allocated, "0" is set to the allocation target.

The "psychographic attributes" are information indicating, for example, the values, lifestyle, character, and preference of the user. The "psychographic attributes" are classified into, for example, attributes "vehicle", "cosmetics", "clothes", and "travel". In the example illustrated in FIG. 3, "1" is stored in each attribute when the preference of the user is relatively high and "0" is stored in each attribute in the other cases. In addition, the "psychographic attributes" are not limited to the attributes illustrated in FIG. 3, but may include various attributes, such as economy, politics, baseball, soccer, other sports, sweets, a personal computer, white goods, and furniture.

The "demographic attributes" indicate demographic user attribute information. The "demographic attributes" are classified into, for example, attributes "sex" and "age" of the user. For example, "1" is stored in the attribute "sex" illustrated in FIG. 3 when the user is a female and "2" is stored in the attribute "sex" when the user is a male. The age of the user is stored in the attribute "age". The "demographic attributes" are not limited to the attributes illustrated in FIG. 3, but may include various attributes, such as the job, family structure, annual income, address, native place, and academic background of the user.

The "psychographic attributes" and the "demographic attributes" are the same as those in the user information table in the user information DB 12. The control unit 15 may presume the user who is set in the user information table as the delivery target user and use the delivery target ID as the user ID. In this case, information on the "psychographic attributes" and the "demographic attributes" can be acquired from the user information table on the basis of the user ID.

The future log prediction unit 21 can predict the delivery target user who will be the advertisement delivery destination for a predetermined future period on the basis of, for example, the access log in the same period last year or the access log in the previous predetermined period. For example, the future log prediction unit 21 can presume the user who issued the advertising information delivery request for the previous month as the delivery target user for the next month.

The future log prediction unit 21 may perform a statistical process for the past log which is set in the access log table, which will be described below, in the past log DB 13 to determine the tendency of the delivery target user who will be the future advertisement delivery destination, and predict the future log on the basis of the determination result. In this case, for example, the future log prediction unit 21 may determine the tendency of the delivery target user, considering, for example, weather or temperature change information.

The future log prediction unit 21 can set the predicted future log in the future log table. In addition, the future log prediction unit 21 may set the future log which is acquired from an external apparatus through the communication unit 10 in the future log table.

Accepting Unit 22

The accepting unit 22 determines whether to accept the order request from the advertiser terminal 3 on the basis of the future log set in the future log table. When accepting unit 22 determines to accept the order request, it transmits a response to the reception of the order to the advertiser terminal 3.

As described above, the order request from the advertiser terminal 3 includes designated information, such as the designated user attributes, the designated number of deliveries, and the designated delivery period. When an order request is issued from the advertiser terminal 3, the accepting unit 22 counts the number of non-allocated users with the user attributes designated by the order request among the delivery target users set in the future log table. In the following description, for ease of understanding, it is assumed that the target period for which the future advertisement delivery destination is predicted is equal to the delivery period designated by the order request.

When the count result is equal to or greater than the designated number of deliveries in the order request, the accepting unit 22 accepts the order request from the advertiser terminal 3. For example, when receiving an order request indicating that the designated user attribute is "vehicle" and the designated number of deliveries is "100", the accepting unit 22 counts the number of delivery target users with the attribute "vehicle" to which "1" is set in the future log table. When the count result is equal to or greater than "100", the accepting unit 22 accepts the order request from the advertiser terminal 3. When the count result is less than "100", the accepting unit 22 does not accept the order request from the advertiser terminal 3.

When accepting the order request from the advertiser terminal 3, the accepting unit 22 sets information on the accepted order request in the advertising information table stored in the advertising information DB 11.

Figure 4:
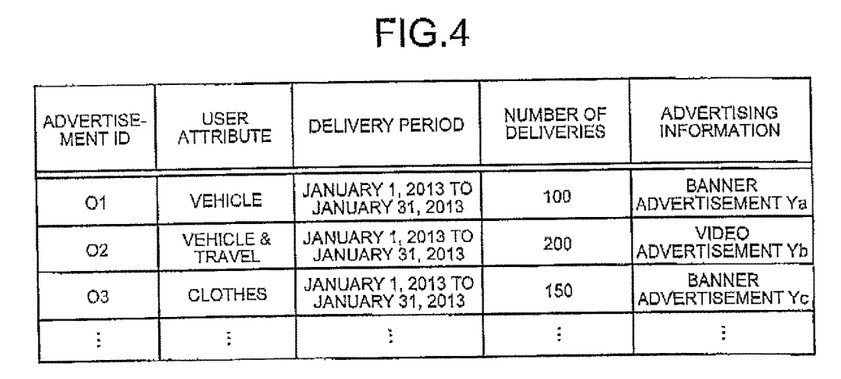
FIG. 4 is a diagram illustrating an example of an advertising information table.

FIG. 4 is a diagram illustrating an example of the advertising information table stored in the advertising information DB 11. As illustrated in FIG. 4, the advertising information table includes information in which "user attributes", a "delivery period", "the number of deliveries", and "advertising information" are associated with each other for each "advertisement ID".

The "advertisement ID" is identification information which is allocated to each accepted order request. The "user attributes" are user attributes (designated user attributes) designated by the order request. The "delivery period" is the period for which the advertising information designated by the order request is delivered. The "number of deliveries" is the number (the designated number of deliveries) of times the advertising information designated by the order request is delivered. In addition, the "advertising information" is advertising information designated by the order request.

For example, for an order request with an advertisement ID "O1", the user attribute of a delivery target is "vehicle", the delivery period of advertising information is from "Jan. 1, 2013 to Jan. 31, 2013", the number of times the advertising information is delivered is "100", and the advertising information is a "banner advertisement Ya". When the number of times the advertising information is delivered is greater than "100" within the delivery period of the advertising information, the control unit 15 ends the process of delivering advertising information in response to the order request ends.

The accepting unit 22 counts a combination of two or more user attributes which are designated by the order request at a frequency equal to or greater than a threshold value as one user attribute (hereinafter, referred to as a combined user attribute in some cases). For example, when a combination of the user attributes "clothes" and "travel" is frequently designated by the order requests, the accepting unit 22 counts the combination of the user attributes "clothes" and "travel" as one user attribute.

Information on the order request accepted by the accepting unit 22 is set in the advertising information table stored in the advertising information DB 11. The accepting unit 22 can determine a combination of two or more user attributes which are designated by the order request at a frequency equal to or greater than the threshold value, on the basis of the advertising information table.

For example, the accepting unit 22 calculates the total number of deliveries designated by the past order request as a first sum and calculates the total number of deliveries designated by the past order request as a second sum for each combination of two or more user attributes, on the basis of the advertising information table. Then, the accepting unit 22 counts, as one user attribute, a combination of the user attributes in which the ratio of the second sum to the first sum is equal to or greater than a predetermined threshold value.

When a combination of the user attributes "vehicle" and "travel" is frequently designated by the order requests and the future log table is in the state illustrated in FIG. 3, the user attribute of the delivery target user with a delivery target ID "F3" is not "vehicle" or "travel", but is "vehicle & travel".

The combination of two or more user attributes which are designated by the order request at a frequency equal to or greater than the threshold value may not be determined by the accepting unit 22, but may be set in the user information DB 12 by an external apparatus.

For example, when the number of non-allocated users is equal to or less than a predetermined value or when the number of non-allocated users with the combined user attribute is equal to or less than a predetermined value, the accepting unit 22 can divide the combined user attribute into a plurality of user attributes. Therefore, it is possible to increase the total number of user attributes. As a result, the possibility that the order request designating the combined user attribute will be accepted is reduced, but it is possible to increase the possibility that other order requests will be accepted.

Allocation Unit 23

The allocation unit 23 allocates the delivery target user set in the future log table to the order request which is accepted by the accepting unit 22. The allocation unit 23 allocates the delivery target users to a plurality of order requests, on the basis of the designated user attribute and the designated number of deliveries in each of the plurality of order requests, such that a non-allocation score is the maximum. The non-allocation score is the number of delivery target users who have not been allocated to the order requests with a predetermined user attribute.

The "predetermined user attribute" is the above-mentioned adequacy determining attribute and can be set by, for example, the administrator (hereinafter, referred to as a delivery administrator) of the advertisement delivery management apparatus 1 through an operation unit (not illustrated) of the advertisement delivery management apparatus 1. The delivery administrator may set all or some of the user attributes as the adequacy determining attributes.

Whenever the accepting unit 22 accepts a new order request, the allocation unit 23 repeatedly performs a process (hereinafter, referred to as a whole process in some cases) of allocating the delivery target users to all of the order requests which are set in the advertising information table.

When there are n order requests in the advertising information table, an order request Oi (1≤i≤n; i is an integer) is defined and it is assumed that the designated number of deliveries in the order request Oi is "o_i". When m attribute patterns are set, an attribute pattern Pj (1≤j≤m; j is an integer) is defined and it is assumed that the number of delivery target users in the attribute pattern Pj is "p_j".

For example, when the future log table is in the state illustrated in FIG. 3, the "attribute pattern" is a combination of the attributes "vehicle", "cosmetics", "clothes", and "travel". For example, when the attribute pattern is defined as {vehicle, cosmetics, clothes, travel, . . . }, each attribute pattern is represented by, for example, {(1, 0, 0, 0, . . . }, {0, 1, 0, 0, . . . }, and {1, 1, 1, 0, . . . }. When the number of attributes is, for example, six, the number of attribute patterns is $2^6$. The user attributes which are less likely to be designated by the order request Oi may be excluded from the attribute pattern.

The allocation unit 23 allocates the delivery target users to a plurality of order requests O1 to On with linear programming such that a non-allocation score KPI is the maximum, using the following formulas (1) and (2) as constraint conditions. In the below-mentioned formula (2), "a_i_j" is the number of delivery target users with a user attribute pattern Pj allocated to the order requests Oi and "c_j" is the number of delivery target users with a user attribute pattern Pj.

$$\sum_{j=1}^{m} a\_i\_j = o\_i \quad (1)$$

$$\sum_{i=1}^{n} a\_i\_j \leq c\_j \quad (2)$$

The non-allocation score KPI is based on the number of delivery target users who have not been allocated to the order requests O1 to On and is the total number of delivery target users with the adequacy determining attributes who have not been allocated to the order requests O1 to On. When the number of non-allocated users is "p", a non-allocated user Fk (1≤k≤p; p is an integer) is defined. When the number of adequacy determining attributes of the non-allocated user Fk is "f_k", the non-allocation score KPI is calculated by the following formula (3):

$$KPI = \sum_{k=1}^{p} f\_k$$

When all of the user attributes are set as the adequacy determining attributes, the non-allocation score KPI is the "total number of user attributes", which is the sum of the "user attributes" of the delivery target users having the "allocation state" set to "0" in the future log table.

For example, in the future log table illustrated in, FIG. 3, it is assumed that the delivery target users with delivery target IDs "F1", "F3", "F4", and "F6" have not been allocated to the order requests O1 to On and the other delivery target users have been allocated to the order requests O1 to On.

Figure 5:
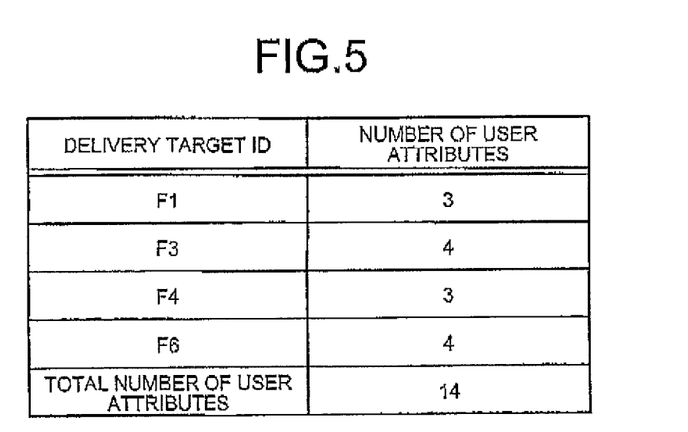
FIG. 5 is a diagram illustrating a method of calculating the total number of user attributes.

In this case, as illustrated in FIG. 5, the "numbers of user attributes" of the delivery target users corresponding to the delivery target IDs "F1", "F3", "F4", and "F6" are "3", "4", "3", and "4", respectively. Therefore, as illustrated in FIG. 5, the "total number of user attributes", which is the sum of the "number of user attributes" of the non-allocated users Fk who have not been allocated to the order requests O1 to On, is "14 (=3+4+3+4)" and the non-allocation score KPI is "14".

In this embodiment, the allocation unit 23 calculates the "total number of user attributes" of the non-allocated users Fk as the non-allocation score KPI. However, the allocation unit 23 may calculate the "total number of user attribute patterns" of the non-allocated users Fk as the non-allocation score KPI.

For example, the allocation unit 23 can calculate the number "e_j" of non-allocated users Fk with the user attribute pattern Pj for each user attribute pattern Pj and use the sum of the number as the non-allocation score KPI. For example, the allocation unit 23 can calculate the non-allocation score KPI using the following formula (4):

$$KPI = \sum_{j=1}^{m} e\_j \quad (4)$$

As such, the allocation unit 23 allocates the delivery target users to a plurality of order requests O1 to On on the basis of the user attributes and the number of deliveries which are designated by each of the plurality of order requests O1 to On such that the number of delivery target users with predetermined user attributes who have not been allocated to the order requests is the maximum.

In this way, it is possible to increase choices for the allocation of the delivery target users to the order requests O1 to On and increase the possibility of the future order requests O1 to On being accepted. Therefore, it is possible to prevent loss of sales opportunities.

Figure 6:
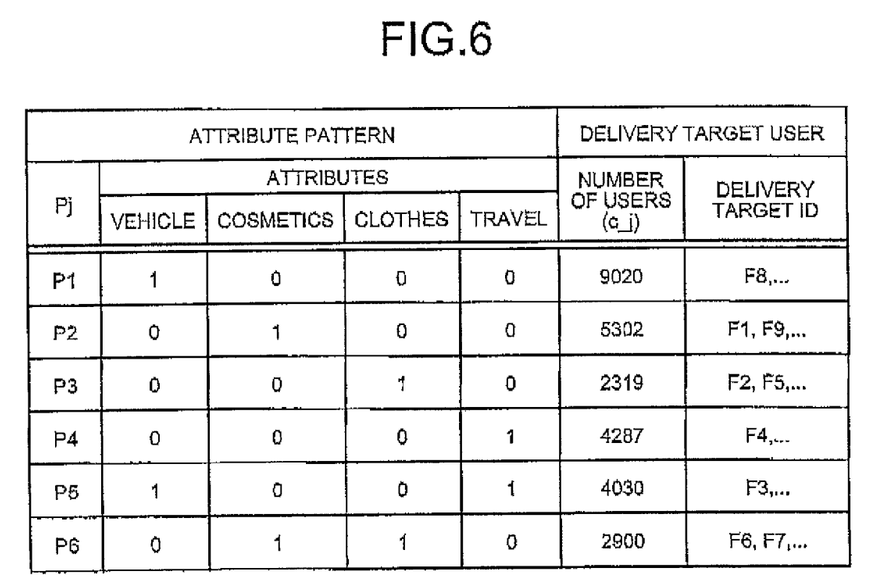
FIG. 6 is a diagram illustrating an example of the relation between the content of attributes in a user attribute pattern and the number of delivery target users.

In this embodiment, an example has been described in which the allocation unit 23 performs the allocation process with linear programming, using the above-mentioned formulas (1) and (2) as constraint condition, such that the non-allocation score KPI is the maximum. FIG. 6 illustrates an example of the relation between the content of attributes in the user attribute pattern Pj and the number of delivery target users c_j.

As illustrated in FIG. 6, it is assumed that user attribute patterns P1 to P6 are "vehicle", "cosmetics", "clothes", "travel", "vehicle & travel", and "cosmetics & clothes". In addition, it is assumed that the number of delivery target users is set as illustrated in FIG. 6. As illustrated in FIG. 6, it is assumed that c_1 to c_6, which are the numbers of delivery target users with the user attribute patterns, are "9020", "5302", "2319", "4287", "4030", and "2900", respectively.

When the user attribute pattern Pj is defined as {vehicle, cosmetics, clothes, travel, . . . }, the user attribute patterns P1 to P6 are {1, 0, 0, 0}, {0, 1, 0, 0}, {0, 0, 1, 0}, {0, 0, 0, 1}, {1, 0, 0, 1}, and {0, 1, 1, 0}, respectively. Therefore, for example, the delivery target user with the user ID "F8" illustrated in FIG. 6 is set to {1, 0, 0, 0} which is the user attribute pattern P1 and the delivery target user with the user ID "F3" illustrated in FIG. 6 is set to {1, 0, 0, 1} which is the user attribute pattern P5.

Figure 7:
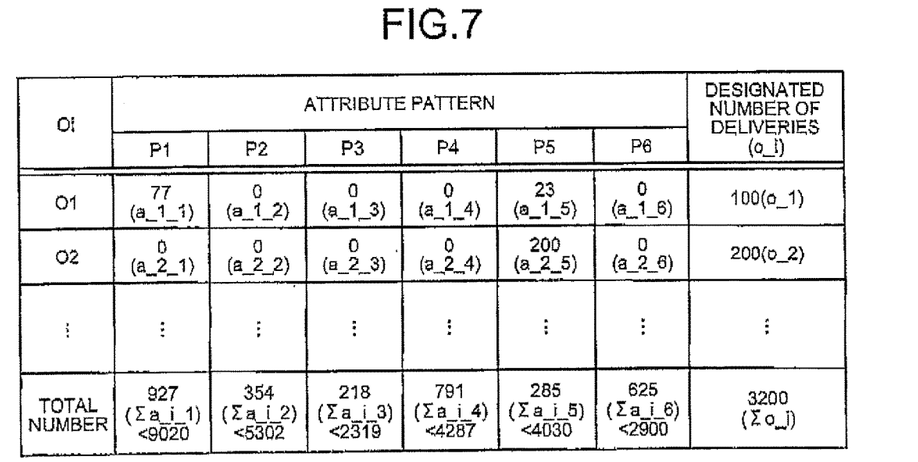
FIG. 7 is a diagram illustrating an example of the allocation of the number of delivery target users in the user attribute pattern allocated to an order request.

The allocation unit 23 sets "a_i_j", which is the allocation of the delivery target users to the order request, with linear programming, using the above-mentioned formulas (1) and (2) as constraint conditions, such that the non-allocation score KPI is the maximum. Assuming that the relation between the content of the attributes in the user attribute pattern Pj and the number of users c_j is in the state illustrated in FIG. 5 and the advertising information table is in the state illustrated in FIG. 4, "a_i_j" is set as illustrated in FIG. 7. FIG. 7 is a diagram illustrating an example of the allocation of "a_i_j".

In the above-mentioned formula (1), the constraint conditions are that the total number of delivery target users allocated to each order request Oi is equal to the designated number of deliveries in the order request. For example, in the order request O1 illustrated in FIG. 7, a_1_1 to a_1_6 are set such that the designated number of deliveries o_1 is "100" and the sum of a_1_1 to a_1_6 is "100".

In the above-mentioned formula (2), the constraint conditions are that, in each attribute pattern Pj, the number of delivery target users allocated to the order request Oi is not greater than the number of users c_j which is the number of delivery target users with the attribute pattern Pj. For example, in the attribute pattern P1, a_1_1 to a_n_1 are set such that the number of users c_j is "9020" and the sum of a_1_1 to a_n_1 is equal to or less than "9020", as illustrated in FIG. 6.

Whenever the accepting unit 22 accepts a new order request, the allocation unit 23 repeatedly performs the whole process of allocating the delivery target users to all of the order requests set in the advertising information table. The whole process is performed for all of the delivery target users set in the future log table.

For example, it is assumed that, after the delivery target users are allocated to the order requests O1 to O10, the accepting unit 22 accepts a new order request O11. In this case, the allocation unit 23 allocates a plurality of delivery target users set in the future log table to the order requests O1 to O11, using the above-mentioned formulas (1) and (2) as constraint conditions, such that the non-allocation score KPI is maximum.

As such, the allocation unit 23 repeatedly performs the whole process of allocating the delivery target users to all of the order requests set in the advertising information table. Therefore, it is possible to appropriately allocate the delivery target users to all of the order requests.

The allocation unit 23 may performs a process (hereinafter, referred to as a partial process in some cases) of allocating the delivery target users to a newly acquired order request while maintaining the allocation of the delivery target users to the order requests.

For example, it is assumed that, after the delivery target users are allocated to the order requests O1 to O10, the accepting unit 22 accepts a new order request O11. In this case, the allocation unit 23 performs a process of allocating the delivery target users to the order request O11 while maintaining the allocation of the delivery target users to the order requests O1 to O10. That is, the allocation unit 23 allocates the delivery target users to a_11_j, without changing the allocation of the delivery target users to a_1_j to a_10_j.

In addition, the allocation unit 23 may perform the whole process at a predetermined time (for example, at night where the number of order requests is small) while performing the partial process for a new order request.

In the above-described embodiment, the linear programming is used to allocate the delivery target users to a plurality of order requests such that the number of delivery target users with adequacy determining attributes who have not been allocated to the order requests is the maximum. However, methods other than the linear programming may be used.

Delivery Ratio Calculation Unit 24

The delivery ratio calculation unit 24 acquires information on "a_i_j", which is the number of allocations of the delivery target users to order requests Oi in the attribute pattern Pj, from the accepting unit 22 and calculates the allocation ratio V_i_j of the delivery target users to each order request Oi for each attribute pattern Pj.

Figure 8:
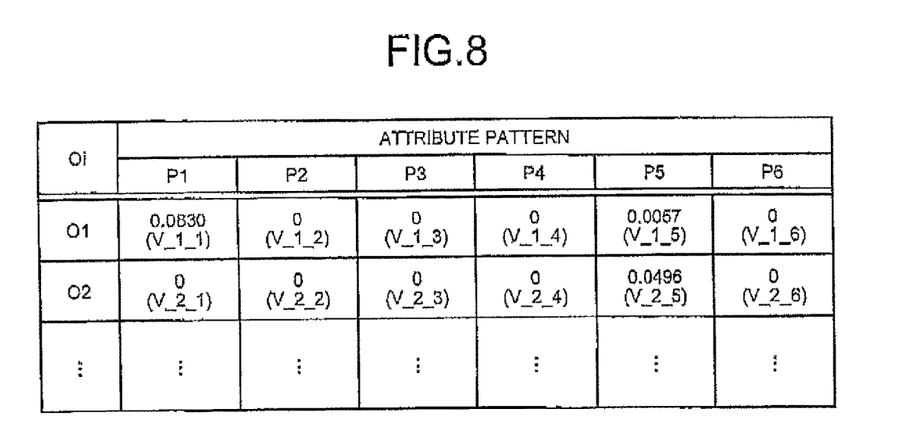
FIG. 8 is a diagram illustrating an example of an allocation ratio information table.

Specifically, the delivery ratio calculation unit 24 calculates the allocation ratio V_i_j of the delivery target users to the order requests Oi for each attribute pattern Pj on the basis of the following formula (5) and sets the calculated allocation ratio V_i_j in an allocation ratio information table stored in the advertising information DB 11. FIG. 8 is a diagram illustrating an example of the allocation ratio information table.

$$V\_i\_j = \frac{a\_i\_j}{\sum_{i=1}^{n} a\_i\_j} \quad (5)$$

For example, in the example of illustrated in FIG. 7, "a_1_5", which is the number of delivery target users allocated to the order request O1 in the attribute pattern P5, is "23" and the total number of attribute patterns P5 is "4030". Therefore, the delivery ratio calculation unit 24 calculates the allocation ratio V_1_5 of the delivery target users to the order request O1 in the attribute pattern P5 as "0.0057 (=23/4030)" and sets the calculated allocation ratio in the allocation ratio information table, as illustrated in FIG. 8.

In addition, "a_2_5", which is the number of delivery target users allocated to the order request O2 in the attribute pattern P5, is "200" and the total number of attribute patterns P5 is "4030". Therefore, the delivery ratio calculation unit 24 calculates the allocation ratio V_2_5 of the delivery target users to the order request O2 in the attribute pattern P5 as "0.0496 (=200/4030)" and sets the calculated allocation ratio in the allocation ratio information table, as illustrated in FIG. 8.

As such, since the delivery ratio calculation unit 24 acquires information on "a_i_j", which is the number of allocations of the delivery target users to the order request Oi in the attribute pattern Pj, from the accepting unit 22, it is possible to easily and rapidly calculate the allocation ratio V_i_j.

Advertisement Delivery Unit 25

When a request to deliver advertising information is received from the user terminal 4, the advertisement delivery unit 25 acquires advertising information corresponding to the user attributes of the terminal user from an advertising information table stored in the advertising information DB 11 on the basis of the allocation ratio information table in the advertising information DB 15. Then, the advertisement delivery unit 25 transmits the acquired advertising information from the communication unit 10 to the user terminal 4 which is a delivery request source.

The advertisement delivery unit 25 acquires the allocation ratios V_1_j to V_n_j corresponding to the attribute patterns Pj of the user attributes of the terminal users from the allocation ratio information table in the advertising information DB 11. Then, the advertisement delivery unit 25 selects one order request from the order requests O1 to On with a probability corresponding to the allocation ratios V_1_j to V_n_j and acquires the advertising information of the advertisement request designated by the selected order request from the advertising information table.

For example, when the terminal user who has issued an advertising information delivery request has the user attribute "vehicle", the advertisement delivery unit 25 acquires advertising information "banner advertisement Ya" in the order request O1 from the advertising information table with a probability of 0.57% and transmits the acquired advertising information to the user terminal 4 which is the delivery request source. In addition, the advertisement delivery unit 25 acquires advertising information "video advertisement Yb" in the order request O2 from the advertising information table with a probability of 4.96% and transmits the acquired advertising information to the user terminal 4 which is the delivery request source.

As such, the advertisement delivery unit 25 selects advertising information in the order request Oi corresponding to the user attributes of the terminal user on the basis of the allocation result of the allocation unit 23 and transmits the selected advertising information to the user terminal 4, in response to the advertisement delivery request from the user terminal 4. Therefore, when the user with the same user attributes as the delivery target user who is the predicted future log accesses the apparatus, it is possible to deliver advertising information according to the management of a sales order stock and appropriately deliver advertisements in response to the accepted order request.

In addition, since the ratio of the users who have been allocated to each order request is calculated for each attribute pattern in advance, it is possible to deliver advertising information, without damaging the real-time properties of advertisement delivery.

Figure 9:
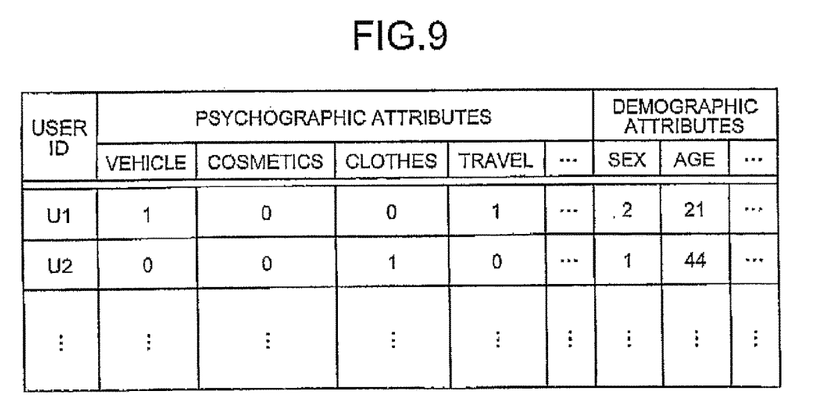
FIG. 9 is a diagram illustrating an example of a user information table.

The user attributes of the user of the user terminal 4 are determined on the basis of the user information table in the user information DB 12. FIG. 9 is a diagram illustrating an example of the user information table stored in the user information DB 12. As illustrated in FIG. 9, the user information table includes information, such as a "user ID", "psychographic attributes", and "demographic attributes".

The "user ID" is identification information for identifying the user of the user terminal 4. The "user ID" corresponds to, for example, user identification information which is set to a hypertext transfer protocol (HTTP) cookie transmitted and received between the advertisement delivery management apparatus 1 and the user terminal 4.

The "psychographic attributes" and the "demographic attributes" are the same as those in the future log table stored in the future log DB 14.

For example, when the user with a user ID "U1" illustrated in FIG. 9 has issued an advertising information delivery request from the user terminal 4, the advertisement delivery unit 25 determines that the user attributes of the user are, for example, "vehicle", "travel", "male", and "21 years old". In addition, for example, when the user with a user ID "U2" illustrated in FIG. 9 has issued an advertising information delivery request from the user terminal 4, the advertisement delivery unit 25 determines that the user attributes of the user are "clothes", "female", and "44 years old".

Figure 10:
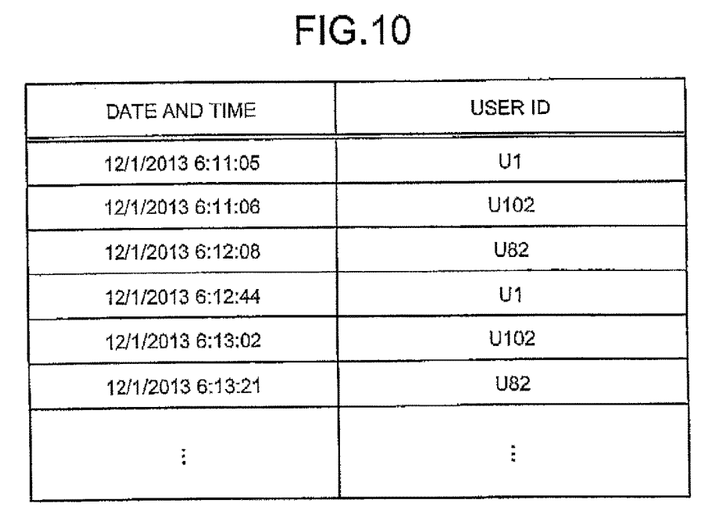
FIG. 10 is a diagram illustrating an example of an access log table.

The advertisement delivery unit 25 sets the user ID of the user who has issued the advertising information delivery request in an access log table stored in the past log DB 13. FIG. 10 is a diagram illustrating an example of the access log table stored in the past log DB 13.

As illustrated in FIG. 10, information (hereinafter, referred to as a past log in some cases) in which the day and time when the user of the user terminal 4 issues the advertising information delivery request to the advertisement delivery management apparatus 1 is associated with the user ID is set in the access log table. The advertisement delivery unit 25 updates the access log table whenever the advertising information delivery request is issued from the user terminal 4.

3. Process Flow of Advertisement Delivery Management Apparatus 1

Figure 11:
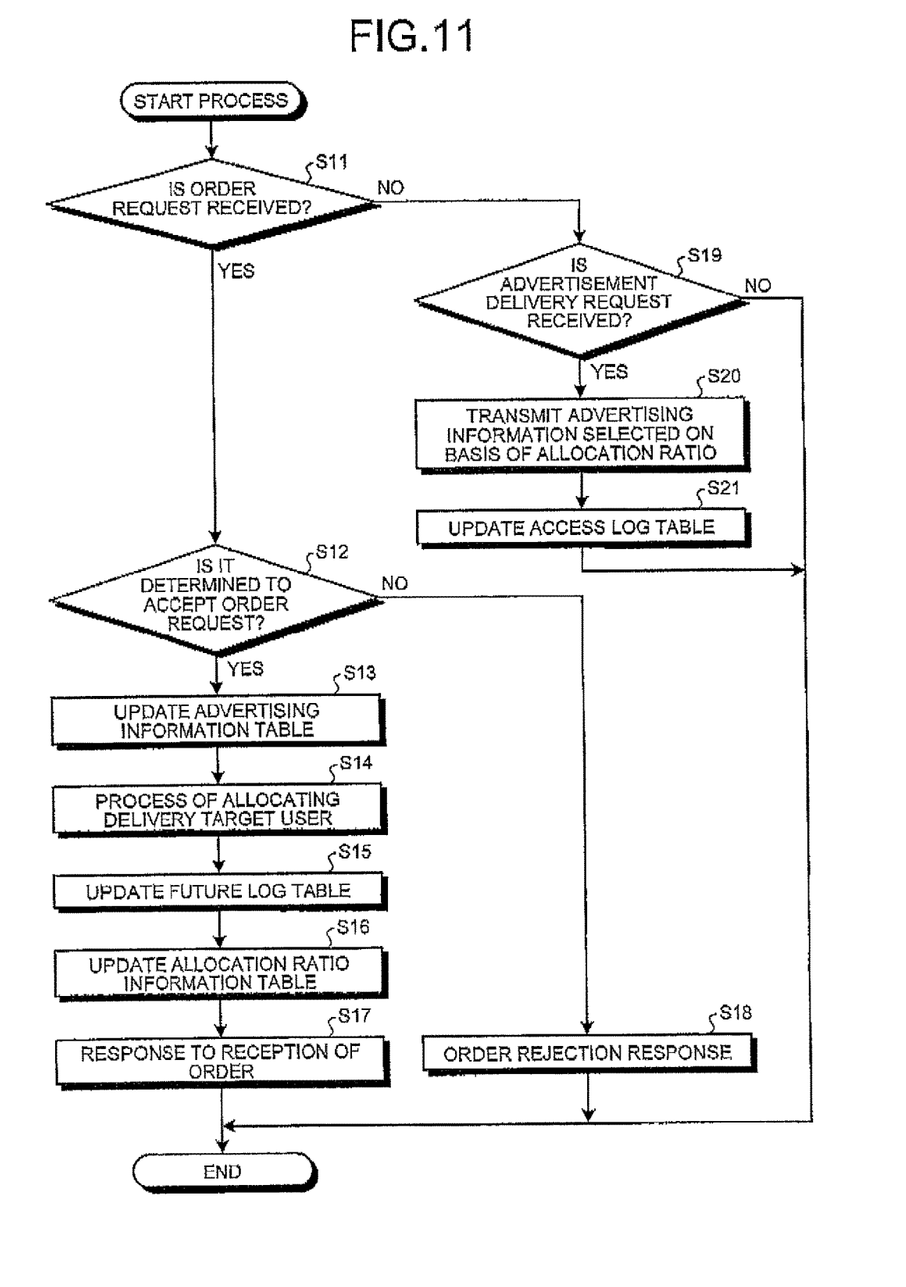
FIG. 11 is a diagram illustrating the flow of the advertisement delivery management process of the advertisement delivery management apparatus according to the embodiment.

Next, the procedure of an advertisement delivery management process of the advertisement delivery management apparatus 1 according to the embodiment will be described. FIG. 11 is a diagram illustrating an example of the flow of the advertisement delivery management process of the advertisement delivery management apparatus 1 according to the embodiment. The advertisement delivery management process is repeatedly performed by the control unit 15 of the advertisement delivery management apparatus 1 and the description is focused on the processes of the accepting unit 22, the allocation unit 23, the delivery ratio calculation unit 24, and the advertisement delivery unit 25 of the control unit 15.

As illustrated in FIG. 11, when the advertisement delivery management process starts, the control unit 15 of the advertisement delivery management apparatus 1 determines whether an order request has been received from the advertiser terminal 3 (Step S11). When it is determined that the order request has been received from the advertiser terminal 3 (Yes in Step S11), the control unit 15 determines whether to receive the order request from the advertiser terminal 3 on the basis of the future log set in the future log table (Step S12). For example, the control unit 15 counts the number of user attributes designated by the order request among the user attributes of the non-allocated users set in the future log table. When the count result is equal to or greater than the number of deliveries designated by the order request, the control unit 15 determines to accept the order request.

When the control unit 15 determines to accept the order request from the advertiser terminal 3 (Yes in step S12), the control unit 15 sets information included in the order request in the advertising information table and updates the advertising information table (Step S13). The information included in the order request includes, for example, user attributes, the number of deliveries, a delivery period, and advertising information. The information is set in the advertising information table.

Then, the control unit 15 performs a process of allocating the delivery target users (Step S14). The allocation process allocates the delivery target users with the user attributes designated by the order request to the order request.

Then, the control unit 15 updates the future log table on the basis of the result of the allocation process in Step S14 (Step S15). Specifically, the control unit 15 changes the non-allocated user who has been allocated to the order request among the non-allocated users set in the future log table to the allocated user. The non-allocated user is changed to the allocated user by changing the "allocation state" from "0" to "1" and setting information on the allocated order request to the "allocation target".

Then, the control unit 15 updates the allocation ratio information table (Step S16). In this process, the control unit 15 calculates the allocation ratio $V\_i\_j$ of the delivery target users to the order request Oi for each attribute pattern Pj on the basis of "$a\_i\_j$" which is the number of allocations of the delivery target users to the order request Oi in the attribute pattern Fj. Then, the control unit 15 sets the calculated allocation ratio $V\_i\_j$ in the allocation ratio information table stored in the advertising information DB 11.

Then, the control unit 15 transmits a response to the reception of the order to the advertiser terminal 3 through the communication unit 10 (Step S17) and ends the advertisement delivery management process. On the other hand, when the control unit 15 determines not to accept the order request from the advertiser terminal 3 in Step S12 (No in Step S12), it transmits an order rejection response to the advertiser terminal 3 through the communication unit 10 (Step S18) and ends the advertisement delivery management process.

When it is determined in Step S11 that the order request has not been received from the advertiser terminal 3 (No in Step S11), the control unit 15 determines whether an advertising information delivery request has been received from the user terminal 4 through the communication unit 10 (Step S19). When it is determined that the advertising information delivery request has been received (Yes in Step S19), the control unit 15 transmits the selected advertising information on the basis of the allocation ratio $V\_i\_j$ (Step S20).

In Step S20, the control unit 15 acquires, from the allocation ratio information table, information on the allocation ratios $V\_1\_j$ to $V\_n\_j$ corresponding to the attribute patterns Pj of the user attributes of the terminal user. The control unit 15 selects one order request from the order request O1 to On on the basis of the probability corresponding to the allocation ratios $V\_1\_j$ to $V\_n\_j$ and acquires the advertising information of the advertisement request designated by the selected order request from the advertising information table.

Then, the control unit 15 sets the user ID of the user who has issued the advertising information delivery request in the access log table stored in the past log DB 13 to update the access log table (Step S21).

When the process in Step S21 ends or when it is determined in Step S19 that the advertising information delivery request has not been received (No in Step S19), the control unit 15 ends the advertisement delivery management process.

4. Modifications

In the above-described embodiment, the attribute patterns Pj are exclusive attribute patterns and the delivery target user is allocated to any one of the attribute patterns Pj. However, when the number of classified attributes increases, it is difficult to prepare the exclusive attribute patterns. In this case, for example, the attribute pattern may be a combination of two or more user attributes which are frequently designated by the order requests to suppress an increase in the number of attribute patterns.

When the increase in the number of attribute patterns is suppressed, in some cases, some of the attribute patterns are not the exclusive attribute patterns and the user of the user terminal 4 have the user attributes in a plurality of attribute patterns Pj. In this case, the advertisement delivery unit 25 may give a weight to the allocation ratio $V\_i\_j$.

For example, the advertisement delivery unit 25 acquires the allocation ratio $V\_i\_j$ which is set to a plurality of attribute patterns Pj corresponding to the user attributes of the terminal user from the allocation ratio information table. Then, the advertisement delivery unit 25 divides the allocation ratio $V\_i\_j$ by the number of attribute patterns Pj corresponding to the user attributes of the terminal user and selects one of the order requests with the probability corresponding to the result of the division.

For example, when three attribute patterns P1 to P3 correspond to the user attributes of the terminal user who is an advertising information delivery destination, the advertisement delivery unit 25 divides the allocation ratios $V\_1\_j$, $V\_2\_j$, and $V\_3 j$ by 3. Then, the advertisement delivery unit 25 selects one of the order requests with the probability corresponding to $V\_1\_j/3$, $V\_2\_j/3$, and $V\_3\_j/3$ which are the results of the division.

In addition, the advertisement delivery unit 25 may give a weight during the division process. For example, when three attribute patterns P1 to P3 correspond to the user attributes of the terminal user who is the advertising information delivery destination, the advertisement delivery unit 25 divides the allocation ratios $V\_1\_j$, $V\_2\_j$, and $V\_3\_j$ by $\Sigma a\_i\_1/(\Sigma a\_i\_1+\Sigma a\_i\_2+\Sigma a\_i\_3\_)$, $\Sigma a\_i\_2/(\Sigma a\_i\_1+\Sigma a\_i\_2+\Sigma a\_i\_3)$, and $\Sigma a\_i\_3/(\Sigma a\_i\_1+\Sigma a\_i\_2+\Sigma a\_i\_3)$, respectively. Then, the advertisement delivery unit 25 can select one of the order requests with the probability corresponding to the results of the division.

For example, in the example illustrated in FIG. 7, $\Sigma a\_i\_1$ is 927, $\Sigma a\_i\_2$ is 354, $\Sigma a\_i\_3$ is 218, and $\Sigma a\_i\_1+\Sigma a\_i\_2+\Sigma a\_i\_3$ is 1499. In this case, for example, for the allocation ratio $V\_1\_1$ (=0.0830), $V\_1\_1 \times 927/1499$ is 0.0513. Therefore, the advertisement delivery unit 25 selects advertising information corresponding to the order request O1 with a probability (5.13%) corresponding to "0.0513".

As such, the weight makes it possible to accurately deliver advertising information to the allocation result of the allocation unit 23 according to the management of a sales order stock even when the user of the user terminal 4 have the user attributes in a plurality of attribute patterns Pj.

In the above-described embodiment, the allocation unit 23 allocates the delivery target users to each of the plurality of order requests O1 to On with linear programming, using the above-mentioned formulas (1) and (2) as constraint conditions, such that the non-allocation score KPI is the maximum. However, other allocation methods may be applied.

For example, the allocation unit 23 may use, as a score, the ratio of the non-allocated users with the user attributes for which the ratio (or number) of the non-allocated users is the minimum on the basis of the ratio (or number) of the non-allocated users, who are the delivery target users, to the order requests for each user attribute and allocate the delivery target users to the order requests such that a reduction in the score is the minimum.

In addition, the allocation unit 23 may use, as a score, the ratio of the non-allocated users with the user attributes for which the ratio (or number) of the non-allocated users is the minimum and allocate the delivery target users to the order requests such that a reduction in the score is the minimum.

The allocation unit 23 may calculate the ratio of the percentage of the non-allocated users to the prediction rate of each user attribute for each user attribute, use the sum of the calculation results as a score, and allocate the delivery target users to the order requests such that a reduction in the score is the minimum.

In the above-described embodiment, the delivery ratio calculation unit 24 calculates the allocation ratio $V\_i\_j$ on the basis of "$a\_i\_j$" which is the number of allocations of the delivery target users to the order request Oi in the attribute pattern Pj. However, the delivery ratio calculation unit 24 may perform other calculation processes. For example, the delivery ratio calculation unit 24 may perform a statistical process for the user attributes of the users allocated to the order requests among the delivery target users set in the future log table to calculate the allocation ratio $V\_i\_j$.

The delivery ratio calculation unit 24 may select the advertising information of the order request allocated to the allocated user with the same or similar user attributes as the terminal user who is an advertising information delivery destination, with reference to the future log table.

In the above-described embodiment, for ease of understanding, the target period for which the future advertisement delivery destination is predicted is equal to the delivery period of the order request. However, the target period for which the future advertisement delivery destination is predicted may not be equal to the delivery period of the order request. For example, the target period for which the future advertisement delivery destination is predicted may be a day and the delivery period of the order request may be a day. In this case, the allocation unit 23 may perform a process of allocating the delivery target users on a daily basis. Further, the delivery ratio calculation unit 24 may perform a process of calculating the allocation ratio $V\_i\_j$ on a daily basis.

5. Effect

In the advertisement delivery management apparatus 1 according to the embodiment, the future log DB 14 (an example of a prediction information storage unit) stores information including the user attributes of a plurality of delivery target users who is predicted as the future advertisement delivery destinations. The accepting unit 22 (an example of an acquisition unit) acquires the order request designating the user attributes and the number of deliveries. The allocation unit 23 (an example of an allocation unit) selects the delivery target users who have the user attributes designated by the order request and whose number corresponds to the number of deliveries from the plurality of delivery target users and allocates the selected delivery target users to the order request. The advertisement delivery unit 25 (an example of an advertisement delivery unit) selects the advertising information of the order request corresponding to the user attributes of the user of the user terminal 4 on the basis of the allocation result of the allocation unit 23 and transmits the selected advertising information to the user terminal 4, in response to the advertisement delivery request from the user terminal 4.

According to this structure, when a user with the same user attribute as the delivery target user, which is the predicted future log, accesses the apparatus, it is possible to deliver advertising information according to the management of a sales order stock and appropriately deliver advertisements to the accepted order request. In addition, it is possible to deliver advertising information, without damaging the real-time properties of advertisement delivery.

The delivery ratio calculation unit 24 (an example of a calculation unit) calculates the ratio of the delivery target users who are allocated to each order request by the allocation unit 23 for each attribute pattern including one or more user attributes. The advertisement delivery unit 25 selects the advertising information of the order request corresponding to the attribute pattern Pj of the user attributes of the user of the user terminal 4 with the probability corresponding to the allocation ratio and transmits the advertising information to the user terminal 4.

According to this structure, it is possible to select the advertising information of the order request with the probability corresponding to the allocation ratio of the delivery target users by the allocation unit 23 for each attribute pattern Pj. It is possible to accurately deliver the advertising information according to the management of a sales order stock, on the basis of the allocation result of the allocation unit 23.

The allocation unit 23 allocates the delivery target users to each order request for each attribute pattern Pj such that the number of delivery target users who have not been allocated to the order requests among the delivery target users with a predetermined user attribute is the maximum. The delivery ratio calculation unit 24 calculates the allocation ratio $V\_i\_j$ on the basis of "$a\_i\_j$" which is the number of delivery target users allocated to each order request for each attribute pattern Pj by the allocation unit 23.

According to this structure, it is possible to calculate the allocation ratio $V\_i\_j$ on the basis of "$a\_i\_j$" calculated by the allocation unit 23. Therefore, it is possible to rapidly calculate the allocation ratio $V\_i\_j$. In addition, it is possible to appropriately allocate the delivery target users to advertisement delivery orders and prevent a reduction in the possibility of a future advertisement delivery order request being accepted. As a result, it is possible to prevent loss of sales opportunities.

The allocation unit 23 allocates the delivery target users to the order requests such that the number of predetermined user attributes of the delivery target users who have not been allocated to the order requests is the maximum.

According to this structure, it is possible to appropriately allocate the delivery target users to advertisement delivery orders and prevent a reduction in the possibility of a future advertisement delivery order request being accepted. Therefore, it is possible to prevent loss of sales opportunities.

6. Others

The advertisement delivery management apparatus 1 may be implemented by a plurality of server computers. In addition, the structure of the advertisement delivery management apparatus 1 may be flexibly changed depending on the functions. For example, an external platform may be called by an application programming interface (API) or network computing and then executed to implement the advertisement delivery management apparatus 1. The advertisement delivery management apparatus 1 and the information delivery apparatus 2 may be implemented by one server computer.

According to the embodiment, it is possible to provide an advertisement delivery management apparatus and an advertisement delivery management method which can appropriately deliver advertisements in response to the accepted order request.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An advertisement delivery management apparatus communicating with at least one advertiser terminal and a user terminal via a communication network, the advertisement delivery management apparatus comprising:
   a memory storing information including user attributes of a plurality of delivery target users predicted as future advertisement delivery destinations; and
   a processor operatively coupled to the memory, the processor being programmed to:
     acquire order requests from the at least one advertiser terminal, each order request designating advertising information, a user attribute, and a number of deliveries of the advertising information;
     select delivery target users of the plurality of delivery target users corresponding to the user attribute and the number of deliveries designated by each order request, and allocate the selected delivery target users to the corresponding order request;
     calculate, in advance of receiving advertising information delivery requests, allocation ratios to each order request for each attribute pattern based on a comparison between a number of delivery target users having the corresponding attribute pattern and allocated to the order request, and a total number of the plurality of delivery target users allocated to the corresponding attribute pattern, each attribute pattern including at least one stored user attribute of the plurality of delivery target users;
     receive an advertising information delivery request from the user terminal, and acquire at least one user attribute corresponding to the user terminal;
     in response to the at least one user attribute corresponding to the user terminal being included in at least two attribute patterns, determine and assign weights to the allocation ratios of the at least two attribute patterns by dividing each of the allocation ratios of the at least two attribute patterns by: (i) a number of the at least two attribute patterns, or (ii) a value provided by dividing a number of the delivery target users allocated to the corresponding one of the at least two attribute patterns by a total number of the delivery target users allocated to the at least two attribute patterns;
     in response to the received advertising information delivery request, select the advertising information designated by the order request corresponding to the at least one user attribute corresponding to the user terminal based on the weighted allocation ratios of the at least two attribute patterns; and
     transmit the selected advertising information to the user terminal.

2. The advertisement delivery management apparatus according to claim 1, wherein the processor is programmed to:
   calculate a ratio of the plurality of delivery target users allocated to each of the order requests for each attribute pattern including at least one user attribute;
   select the advertising information of the order request corresponding to the attribute pattern of the user attributes of the user of the user terminal with a probability corresponding to the allocation ratio; and
   transmit the selected advertising information to the user terminal.

3. The advertisement delivery management apparatus according to claim 2, wherein the processor is programmed to:
   allocate the plurality of delivery target users to each of the order requests for each attribute pattern such that a number of delivery target users that have not been allocated to the order requests among the plurality of delivery target users with a predetermined user attribute is a maximum value; and
   calculate the allocation ratio based on a number of delivery target users allocated to each order request for each attribute pattern.

4. The advertisement delivery management apparatus according to claim 1, wherein the processor is programmed to allocate the plurality of delivery target users to the order requests such that a number of predetermined user attributes of the plurality of delivery target users who have not been allocated to the order requests among the plurality of delivery target users with a predetermined user attribute is a maximum value.

5. An advertisement delivery management method performed by a computer, the advertisement delivery management method comprising:
   (a) acquiring, by the computer, information including user attributes of a plurality of delivery target users predicted as future advertisement delivery destinations;
   (b) acquiring, by the computer, order requests from at least one advertiser terminal, each order request designating advertising information, a user attribute, and a number of deliveries of the advertising information;
   (c) selecting, by the computer, delivery target users of the plurality of delivery target users corresponding to the user attribute and the number of deliveries designated by each order request;
   (d) allocating, by the computer, the selected delivery target users to the corresponding order request;
   (e) calculating, by the computer, in advance of receiving advertising information delivery requests, allocation ratios to each order request for each attribute pattern based on a comparison between a number of delivery target users having the corresponding attribute pattern and allocated to the order request, and a total number of the plurality of delivery target users allocated to the corresponding attribute pattern, each attribute pattern including at least one stored user attribute of the plurality of delivery target users;
   (f) receiving, by the computer, an advertising information delivery request from the user terminal, and acquiring, by the computer, at least one user attribute corresponding to the user terminal;
   (g) in response to the at least one user attribute corresponding to the user terminal being included in at least two attribute patterns, determining and assigning, by the computer, weights to the allocation ratios of the at least two attribute patterns by dividing each of the allocation ratios of the at least two attribute patterns by:
(i) a number of the at least two attribute patterns, or (ii) a value provided by dividing a number of the delivery target users allocated to the corresponding one of the at least two attribute patterns by a total number of the delivery target users allocated to the at least two attribute patterns;

(h) selecting, by the computer, the advertising information designated by the order request corresponding to the at least one user attribute corresponding to the user terminal based on the weighted allocation ratios of the at least two attribute patterns; and (i) transmitting, by the computer, the selected advertising information to the user terminal.

6. The advertisement delivery management method according to claim 5, further comprising:
(j) calculating, by the computer, a ratio of the plurality of delivery target users allocated to each order request for each attribute pattern including at least one user attribute, wherein
the (h) selecting includes selecting, by the computer, the advertising information of the order request corresponding to the attribute pattern of the user attributes of the user of the user terminal with a probability corresponding to the allocation ratio.

7. The advertisement delivery management method according to claim 6, wherein:
the (c) selecting includes selecting, by the computer, the plurality of delivery target users allocated to each order request for each attribute pattern from the plurality of delivery target users such that a number of delivery target users who have not been allocated to the order requests among the plurality of delivery target users with a predetermined user attribute is a maximum value; and
the (j) calculating includes calculating, by the computer, the allocation ratio based on a number of delivery target users allocated to each order request for each attribute pattern.

8. The advertisement delivery management method according to claim 5, wherein the (c) selecting includes selecting, by the computer, the delivery target users to the order requests from the plurality of delivery target users such that a number of predetermined user attributes of the delivery target users who have not been allocated to the order requests among the delivery target users with a predetermined user attribute is a maximum value.

* * * * *